(12) United States Patent
Noto et al.

(10) Patent No.: US 7,431,063 B2
(45) Date of Patent: Oct. 7, 2008

(54) METHOD FOR PRODUCING A BELT STRUCTURE FOR A VEHICLE TYRE AND VEHICLE TYRE INCLUDING THE BELT STRUCTURE

(75) Inventors: Rodolfo Noto, Gorgonzola (IT); Gaetano Lo Presti, Sesto San Giovanni (IT)

(73) Assignee: Pirelli Pneumatici S.p.A., Milan (IT)

( * ) Notice: Subject to any disclaimer, the term of this patent is extended or adjusted under 35 U.S.C. 154(b) by 149 days.

(21) Appl. No.: 10/496,971

(22) PCT Filed: Nov. 27, 2001

(86) PCT No.: PCT/IT01/00601

§ 371 (c)(1),
(2), (4) Date: Nov. 18, 2004

(87) PCT Pub. No.: WO03/045714

PCT Pub. Date: Jun. 5, 2003

(65) Prior Publication Data

US 2005/0076988 A1    Apr. 14, 2005

(51) Int. Cl.
*B60C 9/20* (2006.01)
*B29D 30/16* (2006.01)

(52) U.S. Cl. .................. 152/526; 152/533; 152/538; 156/117; 156/123; 156/130

(58) Field of Classification Search .............. 152/526, 152/533, 536, 538; 156/117, 126, 130
See application file for complete search history.

(56) References Cited

U.S. PATENT DOCUMENTS 3,719,218 A    3/1973   Leybourne, III
3,841,376 A    10/1974  Paulin et al.

(Continued)

FOREIGN PATENT DOCUMENTS

DE    35 15 944 A1    11/1986

(Continued)

OTHER PUBLICATIONS

Derwent abstract and machine translation for JP 5-92701.*

(Continued)

*Primary Examiner*—Geoffrey L Knable
(74) *Attorney, Agent, or Firm*—Finnegan, Henderson, Farabow, Garrett & Dunner, L.L.P.

(57) ABSTRACT

A method for producing a vehicle tire belt structure includes forming at least one belt strip including at least one circumferential edge with a profile extending along a broken line. A vehicle tire includes a carcass structure, tread band, and belt structure. At least one carcass ply of the carcass structure includes reinforcing cords oriented substantially along radial planes of the tire. The belt structure includes at least one pair of radially superimposed belt strips including a plurality of reinforcing cords parallel to each other. The reinforcing cords of a first belt strip cross those of a radially adjacent belt strip. The reinforcing cords of the first and radially adjacent belt strips are obliquely oriented in opposite directions with respect to an equatorial plane of the tyre. At least one of the belt strips includes at least one circumferential edge with a profile extending along a broken line.

20 Claims, 5 Drawing Sheets

U.S. PATENT DOCUMENTS 3,881,237 A * 5/1975 Barnett ................... 428/573
5,513,685 A * 5/1996 Watanabe et al. ........... 152/531
5,685,928 A * 11/1997 Toyoda ................... 152/533

FOREIGN PATENT DOCUMENTS

| EP | 0 928 680 A1 | 7/1999 |
|---|---|---|
| EP | 0 943 421 A1 | 9/1999 |
| EP | 0 956 940 A1 | 11/1999 |
| FR | 1.287.560 | 3/1962 |
| GB | 2063185 A * | 6/1981 ................. 152/536 |
| JP | 5-92701 | 4/1993 |
| JP | 9-175110 | 7/1997 |
| RU | 2063880 C1 * | 7/1996 |
| WO | 99/17920 A1 | 4/1999 |
| WO | 01/38077 A1 | 5/2001 |

OTHER PUBLICATIONS

Derwent abstract for JP 9-175110.*

* cited by examiner

METHOD FOR PRODUCING A BELT STRUCTURE FOR A VEHICLE TYRE AND VEHICLE TYRE INCLUDING THE BELT STRUCTURE

This application is a national-phase entry under 35 U.S.C. § 371 from International Application No. PCT/IT01/00601, filed Nov. 27, 2001, in the Italian Patent Office, the content of which is relied upon and incorporated herein by reference.

BACKGROUND OF THE INVENTION

1. Field of the Invention

The present invention relates to a method for producing a reinforcing structure, in particular a belt structure for vehicle tyres, comprising the steps of preparing band-like portions each comprising longitudinal threadlike elements arranged parallel to each other and at least partially lined with at least one layer of elastomer material, so as to form at least one belt strip having a continuous circumferential extension about a geometrical axis of rotation.

The invention in question also relates to a tyre for motor vehicles, formed using the abovementioned method.

2. Description of the Related Art

A tyre for vehicle wheels normally comprises a carcass structure essentially composed of one or more carcass plies formed in a substantially toroidal configuration and having their axially opposite side edges engaged with respective annular, circumferentially inextensible, reinforcing structures, usually called "bead wires". Each annular reinforcing structure is incorporated in a so-called "bead" defined along an internal circumferential edge of the tyre for fixing the latter on a corresponding mounting rim.

The carcass structure has mounted on it, in a radially external position, a belt structure comprising one or more belt strips formed in a closed loop and essentially composed of textile or metal cords incorporated in a layer of elastomer material and suitably oriented with respect to each other and to the cords of the adjacent carcass plies.

A tread band is also mounted in a position radially external to the belt structure, said tread band normally consisting of a strip of elastomer material of suitable thickness. It must be pointed out that, for the purposes of the present description, the term "elastomer material" is to be understood as meaning a composition comprising at least one elastomer polymer and at least one reinforcing filler and if necessary additives of various types (for example, cross-linking agents, plasticizers and other additives known in the art).

A pair of sidewalls is mounted on opposite sides of the tyre, each of them lining a side portion of the tyre lying between a so-called shoulder zone, located in the vicinity of the respective side edge of the tread band, and the respective bead wire.

In the less recently developed manufacturing processes, the formation of each belt strip is performed by applying onto said support device and then cutting to size a continuous strip of rubberized fabric formed by joining, one after another, a plurality of portions obtained from a strip of rubberized fabric including a plurality of longitudinal cords parallel to each other and incorporated in a layer of elastomer material, by cutting said strip at a angle of predefined value with respect to the direction of said cords. More particularly, the operations of cutting and joining on said device are performed so as to obtain a so-called belt ring, in which the cords of each portion are oriented with a predetermined inclination with respect to the circumferential extension of said ring.

The belt structure, which may also comprise two or more strips formed in succession in a radially superimposed arrangement, is associated in a radially external position with the carcass structure, normally in combination with an operating step in which the latter, initially made in the form of a cylindrical sleeve, is formed with a toroidal configuration.

According to the more recent production methods, the carcass ply or plies, as well as each of the belt strips, are obtained by laying a plurality of band-like portions, one after another, in a circumferentially adjacent arrangement, on a toroidal support shaped in accordance with the internal form of the tyre to be obtained. A method of this kind allows elimination or at least limitation of the production of intermediate semifinished products for the purposes of preparation of the tyres and is described, for example, in the European patent application published under No. EP 0 928 680 in the name of the same Applicant.

Moreover, the document WO 99/17920 describes a method and an apparatus which produce a belt strip by means of laying band-like portions cut from a continuous band-like element comprising longitudinal threadlike elements arranged parallel to each other and at least partially lined with at least one layer of elastomer material. Each portion, once cut from the continuous band-like element, is removed by means of gripping members of the magnetic or suction-cup type operated by suitable actuating devices. The gripping members retain the band-like portion at its opposite ends and optionally in a central portion thereof, and are moved so as to bring about the application of said portion onto the external surface of a toroidal support, at a predetermined angle with respect to the circumferential extension of the latter. Once application has been completed, the toroidal support is rotated about its geometrical axis through a predetermined angle, so as to allow the application of a new band-like strip adjacent to that applied previously. The sequential repetition of the steps described above results in the formation of a belt strip extending over the whole circumferential extension of the toroidal support.

The Applicant has ascertained that there exists a series of drawbacks arising from the laying of the band-like portions forming belt strips, as performed in accordance with the teachings of the prior art which result in the formation of belt strips with continuous circumferential edges. In fact, the stepped zone formed by said edges of the belt strips negatively influences the performance of the tyre since it gives rise to a very marked rigidity gradient, i.e. a sudden variation in the rigidity value of the tyre carcass along the edges of the belt structure.

This gradient may produce a "hinge effect" on the edge of the tyre, i.e. the generation of a preferential line of deformation in the tyre structure, along which the flexing stresses of the tread are concentrated, with the consequent greater wear of the latter, in particular on the shoulders. This effect is particularly significant when the stepped zone is located at the bottom of the lateral cavity of the tread, where, in addition to the greater deformability of the structure, there is also a reduced thickness of the rubber forming the tread band. It is pointed out that this problem has become more acute with the spread of tyres with a radial carcass since, in the former tyres with a cross-ply carcass, the carcass had at least one pair of radially superimposed plies and the belt structure, when present, usually consisted of belt strips reinforced with textile cords, so that any rigidity gradient was very much less marked, if not negligible.

Moreover, since the transverse cut for obtaining the portions of fabric for the belt strips interrupts the longitudinal metal reinforcing elements, the ends of these threadlike elements in the belt structure thus obtained are truncated and devoid of protective lining, being aligned substantially along the circumferential edges of the structure. This circumferential alignment results in a preferential path along which, during use of the tyre, separations and tears between rubber and metal—due to the low degree of adhesion between rubber and metal at the ends of the interrupted metal elements—may spread, with the further possibility, in the event of water infiltration, of corrosion phenomena which then rapidly spread along the surface of said threadlike elements.

SUMMARY OF THE INVENTION

The Applicant has found that the production of belt structures having at least one circumferential edge with a profile which extends along a broken line prevents the spread of tears which have formed for the reasons indicated above, owing to the interruption in the preferential paths present in the known tyres. The generation of the aforementioned "hinge effect", i.e. the occurrence of said preferential deformation line in the tyre structure, is thus prevented, thereby reducing the risk of dynamic failure of the belt structure with the associated deterioration in the road-holding performance and the behaviour of the tyre in general.

It is pointed out that "broken line" is to be understood as meaning, here and below, any substantially continuous line consisting of a succession of straight and/or curved lines.

In particular, according to a first aspect thereof, the present invention relates to a method for producing a belt structure for vehicle tyres, comprising the step of forming at least one belt strip having a continuous circumferential extension about a geometrical axis of rotation of a preparation drum, characterized in that said at least one belt strip is formed so as to have at least one circumferential edge with a profile extending along a broken line.

Preferably, said drum is a toroidal support formed in accordance with the radially internal surface of the tyre.

In a preferred embodiment, said method is characterized by the fact of forming said belt strip by wrapping onto said drum at least one continuous longitudinal threadlike element by means of an alternating outward and return movement in a direction inclined at a predefined angle of lay with respect to a direction of circumferential extension of said drum.

In a different embodiment, said method is characterized in that it comprises the steps of:

preparing band-like portions having consecutive sides of different length and each comprising at least one longitudinal threadlike element;

applying said band-like portions in a mutually adjacent arrangement along one of their greater sides in the circumferential extension of said drum at a predefined angle of lay with respect to a direction of circumferential extension of said drum.

In accordance with a preferred embodiment of the invention, the band-like portions are cut from a continuous band-like element.

According to another embodiment of the invention, said band-like portions comprise a plurality of longitudinal threadlike elements arranged parallel to each other.

The direction of cutting of the continuous band-like element forms a cutting angle with the direction of the longitudinal threadlike elements.

Preferably, the cutting angle is equal to said predefined angle of lay.

In this case, said band-like portions are advantageously applied with at least one of the smaller sides circumferentially non-aligned with the corresponding smaller side of at least one of the circumferentially adjacent band-like portions.

Alternatively, cutting of the band-like portions may occur in a direction substantially perpendicular to that of the greater side.

In accordance with a first embodiment, said band-like portions are cut to at least two different lengths: advantageously, two band-like portions of different length are applied so that their centres are located on the same straight line oriented parallel to the equatorial plane of the tyre being formed.

In accordance with a further preferred embodiment of the invention, the band-like portions are cut to the same length: in this case, said band-like portions are preferably applied so that their centres are located alternately on one of two straight lines parallel to the equatorial plane of the tyre being formed and situated on opposite sides with respect to the latter.

According to a constructional variant, said two parallel straight lines are equidistant from the equatorial plane of the tyre being formed.

Preferably, the distance of said parallel straight lines from the equatorial plane of the tyre being formed ranges between 2 mm and 10 mm.

In accordance with a further aspect, the invention relates to a motor vehicle tyre provided with:

a carcass structure comprising at least one carcass ply having reinforcing cords oriented substantially along radial planes containing the axis of rotation of the tyre;

a tread band extending circumferentially around said carcass structure;

a belt structure circumferentially interposed between the carcass structure and the tread band and comprising at least one pair of belt strips radially superimposed on each other and axially extending substantially as far as said tread band, said belt strips having a plurality of reinforcing cords parallel to each other in each strip, intersecting with those of the radially adjacent strip and obliquely oriented in the opposite direction with respect to the equatorial plane of the tyre, said tyre being characterized in that said at least one of said belt strips has at least one circumferential edge with a profile which extends along a broken line.

In a particular embodiment of the tyre in question, said belt strip comprises a plurality of band-like portions having consecutive sides of different length.

In a preferred embodiment of the tyre according to the invention, it is envisaged that, in said belt strip, at least one of said band-like portions has at least one of the smaller sides circumferentially non-aligned with the corresponding smaller side of at least one of the band-like portions circumferentially adjacent thereto.

In a further preferred embodiment of the tyre in question, it is envisaged that the circumferential profile of an edge of said belt strip comprises smaller sides of said band-like portions parallel to the direction of the equatorial plane of the tyre.

Alternatively, the tyre in question envisages that the circumferential profile of an edge of said belt strip comprises smaller sides of said band-like portions inclined with respect to the direction of the equatorial plane of the tyre.

In a different embodiment of the tyre according to the invention, it is envisaged that the smaller sides of each band-like portion have a length of between 4 mm and 30 mm.

According to a further embodiment of the tyre in question, said belt strip comprises at least one continuous longitudinal threadlike element having successive convolutions arranged in a direction inclined at a predefined angle of lay with respect to a direction of circumferential extension of said tyre.

Further characteristic features and advantages of the invention will emerge more clearly from the detailed description of a preferred, but not exclusive, embodiment of a method for producing a reinforcing structure for tyres of vehicle wheels and a radial tyre according to the present invention.

BRIEF DESCRIPTION OF THE DRAWINGS

This description will be provided hereinbelow with reference to the accompanying drawings provided solely by way of example, and therefore not limiting, in which.

DETAILED DESCRIPTION OF THE EXEMPLARY EMBODIMENTS

Figure 1:
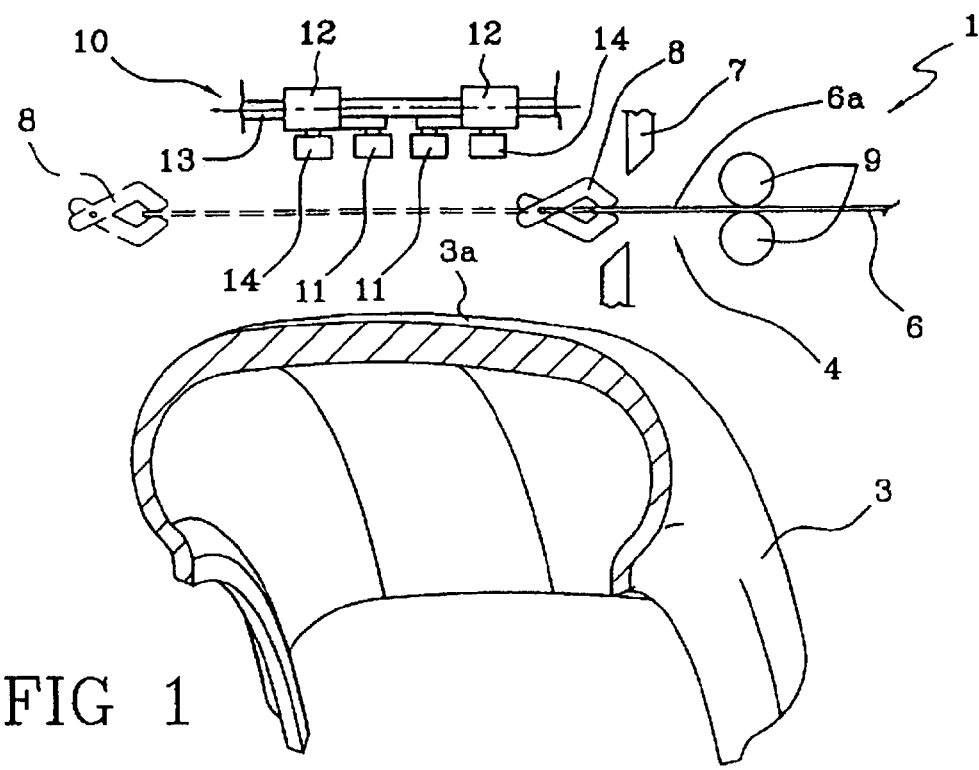
FIG. 1 shows schematically an apparatus able to implement the method according to the invention during an operating step in which an end of a continuous band-like element is about to be gripped by a gripping element.

With reference to said figures, and in particular FIGS. 1 to 4, 1 denotes overall a possible apparatus for producing belt structures for vehicle tyres, in accordance with the method according to the present invention.

In the example of embodiment described, the apparatus 1 is designed to produce a belt structure (see FIGS. 5, 6 and 7) on a toroidal support 3 having an external surface 3a formed substantially in accordance with the internal configuration of the tyre to be obtained. An apparatus of this kind is, for example, described in WO 01/38077 to which reference should be made for further constructional and operational details. It is emphasized that the method according to the invention may also be used on apparatus different from that considered here by way of example. In particular, the support device for the belt being formed may be any type of preparation drum, preferably a forming drum of the prior art, or else the actual carcass of the tyre being formed, mounted on an expandable drum, more widely known as a second-phase drum, inflated and toroidally formed for the tyre completion operations, prior to vulcanization thereof.

Preferably, before starting formation of the belt structure, a carcass structure (not shown in the drawings) is mounted on the toroidal support 3, which structure may be advantageously formed on the same toroidal support 3 in accordance with that described in any one of the patent applications published under Nos EP 0 943 421 and EP 0 928 680, all in the name of the same Applicant. The toroidal support 3, which is not described in detail in that it may be produced in any suitable manner by a person skilled in the art, may consist, for example, of a metal drum which can be disassembled or collapsed in order to facilitate the subsequent removal thereof from the tyre obtained. In an alternative embodiment, as already mentioned, the belt structure is formed directly on the carcass structure, which is mounted on a suitable forming drum and appropriately rigidified, for example by means of inflation, and which in this case would also perform the functions of a toroidal support.

The apparatus 1 comprises at least one supply unit 4 designed to supply, preferably one at a time, band-like portions 5 of predefined length, which are obtained by means of cutting operations carried out in sequence on at least one continuous band-like element 6, supplied by a drawing and/or calendering device or by a supply reel. The continuous band-like element 6, and consequently the portions 5 obtained from it, each have a plurality of cords 16 or similar threadlike elements extending parallel to each other in the longitudinal direction of the band-like element and of the portion itself, and at least partly lined with a layer of elastomer material applied by means of a drawing and/or calendering operation.

Alternatively, said elastomer material may be absent or replaced with any suitable material. There may be any number of threadlike elements, for example cords, present in the band-like element 6, this number being chosen by the person skilled in the art and suitable for easy implementation of the method; it should be pointed out here that said number may also be equal to one, i.e. each portion is formed by a single cord. In this case, it is pointed out that the smaller dimension of the portion is substantially equal to the diameter of the abovementioned cord.

This option is particularly convenient when operating systems laying portions of wire or cord, or systems which form the belt strip by winding a continuous cord around the surface of the support in successive convolutions at a specific angle of lay, are used.

In accordance with the invention, the ends of said portions of wire or the points where the movement of said continuous cord is reversed during laying on the drum, in order to form said convolutions, are axially staggered with respect to each other.

The supply unit 4 comprises at least one cutting member 7 which is intended to cut the continuous band-like element 6 in order to obtain the individual band-like portions 5.

The portions 5, used for the belt strips, have been cut for example from a continuous strip (thin band) of rubberized fabric comprising reinforcing cords each formed by stranded wires made of steel with a high carbon content. The Applicant prefers to use thin bands containing 3 to 10 reinforcing cords.

It is emphasized, however, that, here and below, "thin band" is to be understood as meaning a continuous strip comprising any number of cords, even only one. In this case, each portion formed by a single cord may also be laid on said toroidal male support 3 using the methods described hereinbelow in the case of portions obtained from thin bands with several cords.

In order to obtain the individual band-like portions 5, the continuous band-like element 6 may be cut at a predetermined inclination (angle α') with respect to the longitudinal extension thereof or perpendicularly with respect thereto. The cutting member 7 has, combined with it, at least one gripping member 8 movable between a first working position where, as can be seen from FIG. 1, it is able to engage one end 6a of the continuous band-like element 6 in the vicinity of the cutting member 7, and a second working position where it is located at a distance from said cutting member. As can be seen from FIG. 2, following displacement from the first to the second working position, the gripping member 8 draws the continuous band-like element 6 so as to extend it beyond the cutting member 7 and preferably into a radially adjacent position with respect to the toroidal support 3, over a distance having a length corresponding to that of the portion 5 to be obtained following the subsequent operation of said cutting member.

The transverse position of the portion 5 may be defined, as required, by adjusting the position of the gripping member 8 and therefore the working position. In particular, according to the method of the invention, certain working positions, where the ends of the portions 5 are optionally positioned, are defined. More precisely, the apparatus 1 is able to cut both portions with the same length, by keeping the positions of the gripping member 8 and the cutting member 7 fixed, and portions with different lengths, by alternately setting different values for the positions of the gripping member 8 and/or the cutting member 7.

In FIGS. 1-3, 9 denotes a pair of guide rollers acting on the continuous band-like element 6 in a zone immediately upstream of the cutting member 7.

The apparatus 1 also comprises at least one laying unit 10 which is designed to engage, in sequence, each of the band-like portions 5 prepared in the manner described above, so as to perform the application thereof onto the external surface 3*a* of the toroidal support 3 or onto the carcass structure formed on it, at a predefined angle of lay α (see for example FIG. 5) with respect to a direction of circumferential extension of said toroidal support. The angle of lay a may be easily pre-set by suitably orienting the laying unit 10, as well as the supply unit 4, with respect to the toroidal support 3, or by suitably orienting the latter with respect to said laying unit 10 and supply unit 4.

Alternatively, said band-like portions 5 may be laid in sequence on a different support, until they form a complete belt strip which is then wholly applied onto said external surface 3*a*.

Optionally, said band-like portions 5 may be cut by said cutting member 7 so as to have at least one curved side.

Preferably, the laying unit 10 comprises at least one pressing element 11 movable along the band-like portion 5, acting against the external surface 3*a* of the toroidal support 3. More particularly, in a preferred constructional solution, the use of at least two pressing elements 11 is envisaged, each of said elements being mounted on a support element 12 movable along a guide structure 13 upon actuation of transverse movement devices, for example of the endless screw type, not illustrated in that they may be realized in any manner convenient for a person skilled in the art.

Each support element 12 also has, engaged with it, preferably at least one auxiliary retaining element 14 which is designed to co-operate with the respective pressing element 11 so as to retain the band-like portion 5 during the moments occurring between cutting thereof by the action of the cutting unit 7 and application onto the toroidal support 3. In greater detail, each auxiliary retaining element 14 may consist, for example, of a roller projecting from the respective support element 12 so as to provide a bearing seat for the band-like element 6 driven by the gripping member 8 and for the cut band-like portion 5. In order to favour displacement of the gripping member 8 between the first and the second operating position without mechanical interference, it may also be envisaged that the support elements 12 are angularly rotatable about an axis of longitudinal extension of the guide structure 13, so as to displace the respective pressing elements 11 and auxiliary retaining elements 14 between a rest position in which, as can be seen from FIG. 1, they are located at a distance from a path of longitudinal movement imparted to the continuous band-like element 6 by the gripping member 8, and a working position in which, as can be seen from FIG. 2, they are laid along said movement path and are engaged with said band-like element.

Radial movement devices designed to displace the pressing elements 11 radially towards the external surface 3*a* of the toroidal support 3 are also associated with the laying unit 10. These radial movement devices are neither illustrated nor described in detail in that they may be realized in any manner convenient for a person skilled in the art, and may for example operate on the guide structure 13 and/or directly on the pressing elements 11, so as to bring the band-like portion 5 into contact with the external surface 3*a* of the toroidal support 3. It is also preferably envisaged that the auxiliary retaining elements 14 are movable with respect to the pressing elements 11 in a substantially radial direction with respect to the toroidal support 3. In this way, the pressing elements 11 may bring the band-like portion 5 into contact with the external surface 3*a* without causing mechanical interference between the toroidal support 3 and the auxiliary retaining elements 14. In the examples of embodiment illustrated, the relative movement described above is obtained by displacing directly the pressing elements 11 along the blocks 12, in the direction of the toroidal support 3.

Transverse movement devices—also not shown in that they may be realized in any suitable manner—are likewise provided, said devices operating, for example, between the guide structure 13 and the blocks 12 so as to displace the pressing elements 11 between a first operating condition where they are mutually adjacent and a second operating condition where they are at a distance from an equatorial plane of the toroidal support 3.

The preparation and laying of each band-like portion 5 are performed in the manner described below.

Figure 2:
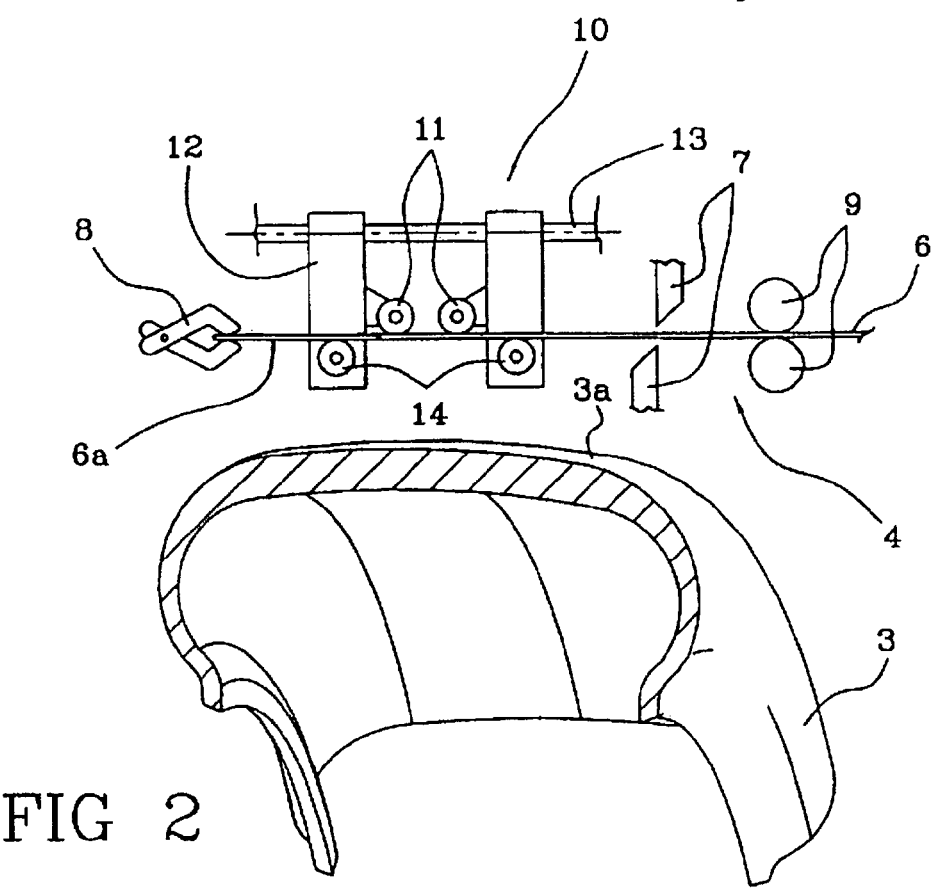
FIG. 2 shows a step following that shown in FIG. 1, in which the band-like element has been extended alongside the toroidal support so as to be engaged by the laying unit.
Figure 3:
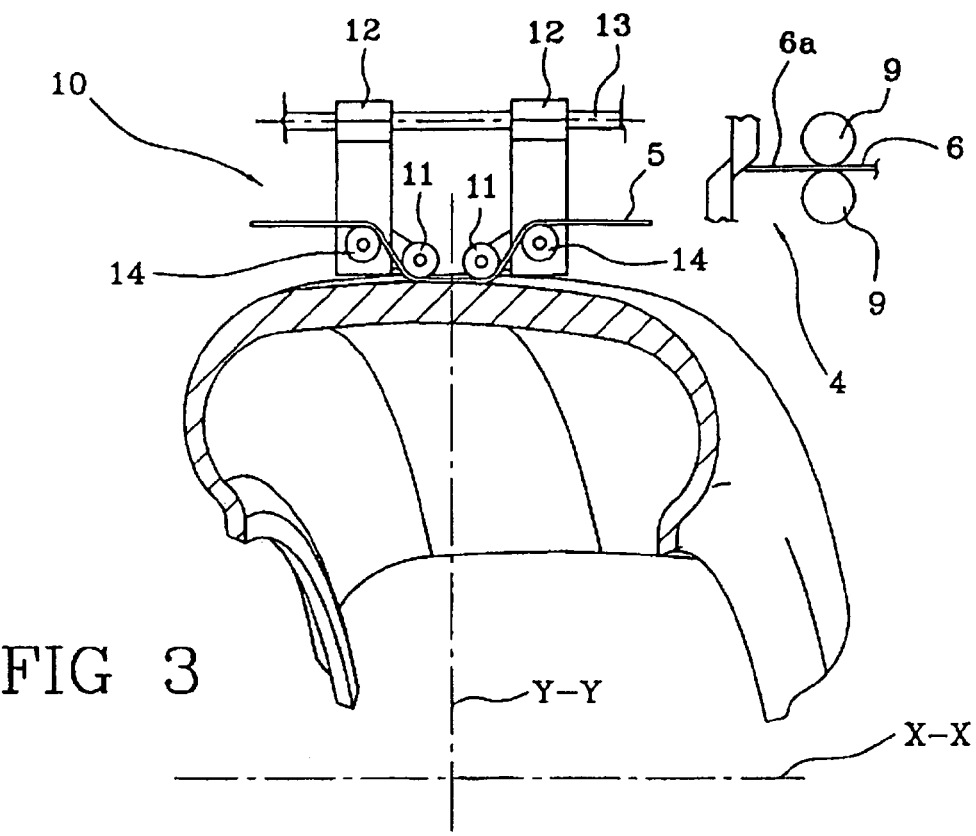
FIG. 3 shows a step following that shown in FIG. 2, in which the band-like portion is about to be applied, along its central portion, onto the toroidal support.
Figure 4:
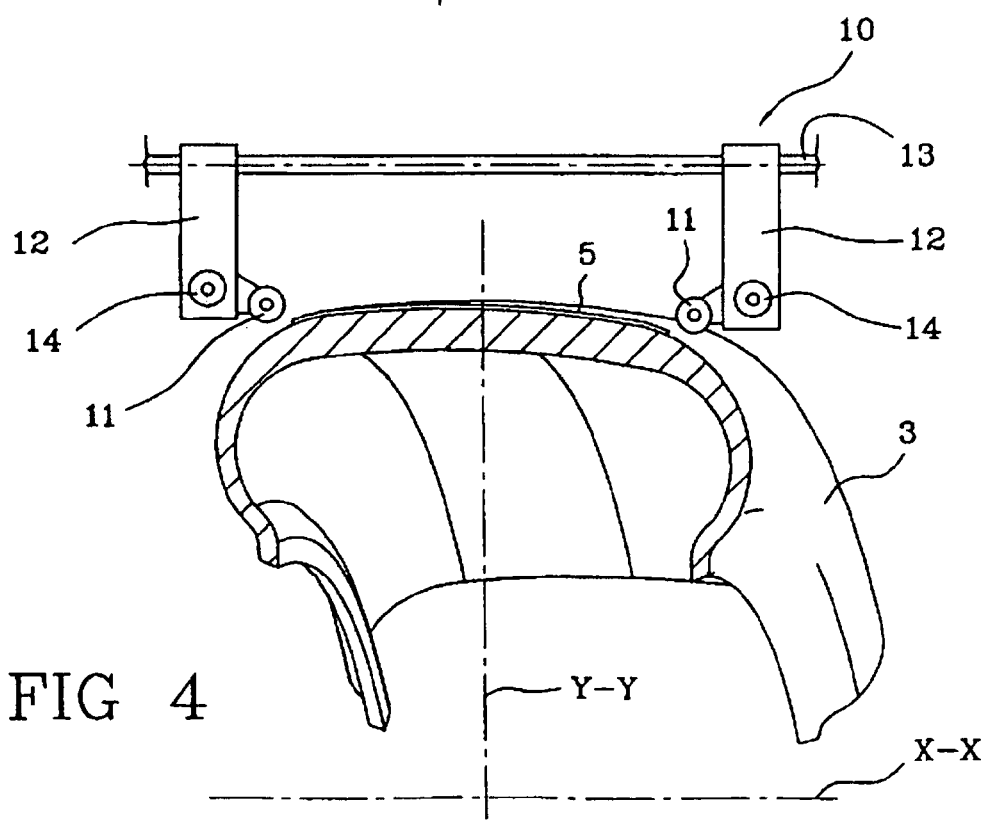
FIG. 4 shows a final step in the application of the band-like portion.

Starting from the condition shown in FIG. 1, the gripping member 8 is brought into the first working position so as to engage the end 6*a* of the continuous band-like element 6 engaged between the guide rollers 9 in the vicinity of the cutting member 7 (FIG. 1). When the gripping member 8 reaches the second working position, the angular rotation of the support elements 12 around the direction of longitudinal extension of the guide structure 13 is performed so as to bring the auxiliary retaining elements 14 into engagement underneath the continuous band-like element 6, which is driven by said gripping member (FIG. 2).

The cutting member 7 is then operated so as to cut the band-like portion 5. In this condition, the auxiliary retaining elements 14 retain the band-like portion 5 transversely extended in a position substantially centred with respect to the equatorial plane of the toroidal support 3.

The displacement of the pressing elements 11 towards the toroidal support 3 is also performed so that the band-like portion 5 is moved radially towards the toroidal support 3 and brought into contact and pressed with its central portion against the external surface 3*a*, in the vicinity of the equatorial plane of said toroidal support. The movement, away from each other, of the support elements 12 along the guide the pressing elements 11 along the band-like portion 5, structure 13 produces the simultaneous displacement of away from the equatorial plane, so to cause the application of said portion onto the toroidal support 3 along its whole length, with a pressing action extending gradually towards the opposite ends of said band-like portion, starting from the central part thereof.

Then, by means of operation of first angular movement devices, an angular rotation of the toroidal support 3 about its geometrical axis, preferably the axis of rotation X-X, with a predetermined angular interval is performed, so as to prepare it for application of another band-like portion 5. The sequential repetition of the operations described above results in the formation of a belt strip 2 with a continuous circumferential extension about the geometrical axis of rotation X-X, formed by a plurality of band-like portions 5 distributed mutually adjacent along the circumferential extension of the toroidal support 3.

Purely by way of example, the first angular movement devices may comprise a stepper motor or other type of actuator operating on a hub 15 coaxially associated with the toroidal support 3. Alternatively, said first angular movement devices may assume any other constructional form convenient for the person skilled in the art and suitable for producing a relative movement between the laying unit 10 and the toroidal support 3, about the chosen geometrical axis.

Preferably, the abovementioned relative movement about the axis of rotation X-X is controlled so that laying of the band-like portions 5 occurs with a circumferential distribution interval corresponding to the width of said band-like portions measured along the equatorial plane of the toroidal support 3. Alternatively, the laying of the band-like portions 5 may be performed with a circumferential distribution interval corresponding to a multiple of the width indicated above so as to produce the formation of the continuous layer following two or more complete revolutions of the toroidal support 3 about the axis of rotation X-X.

Figure 5:
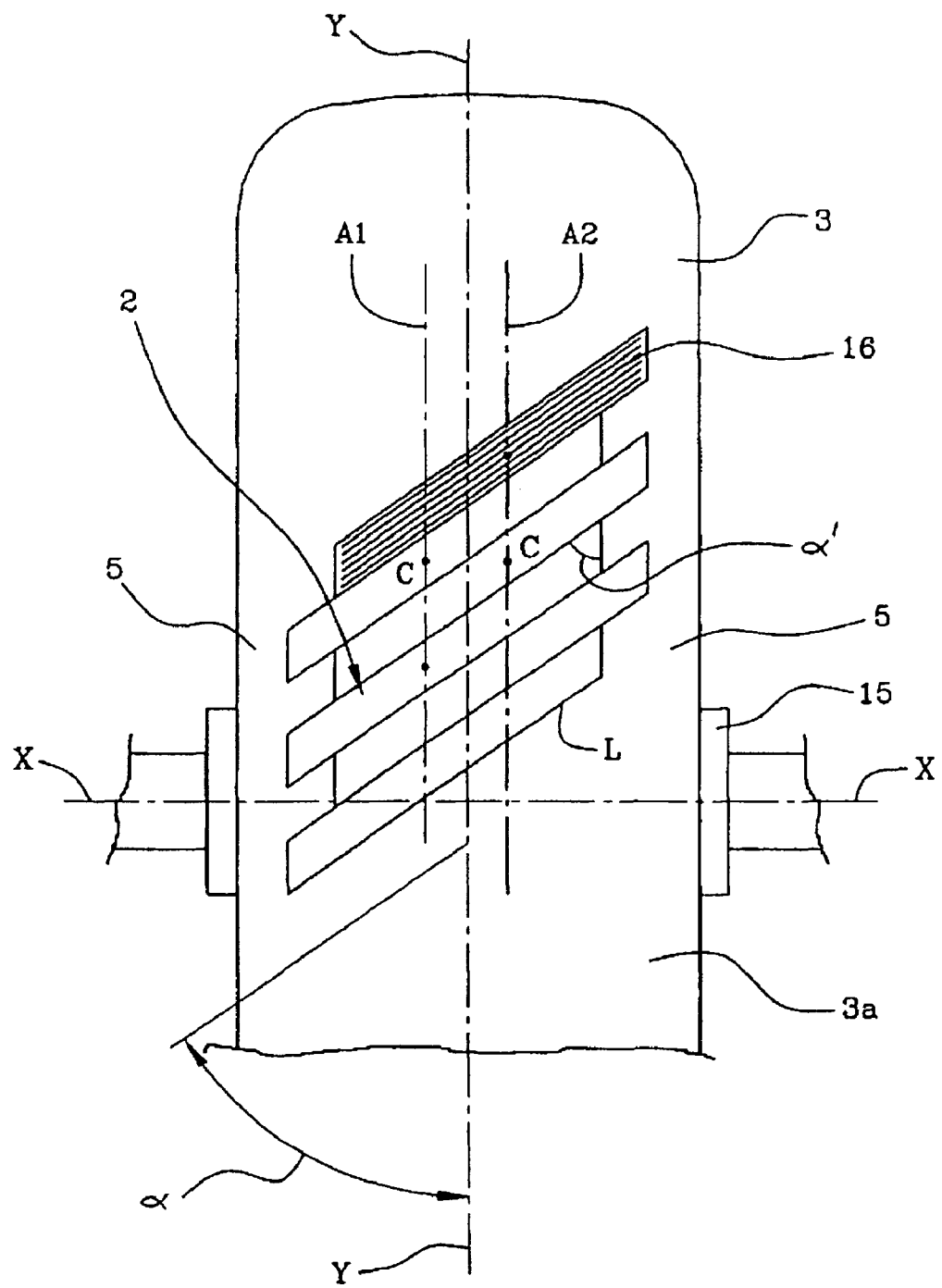
FIG. 5 shows a diagram illustrating the laying of the band-like portions, performed according to one embodiment of the present invention.
Figure 6:
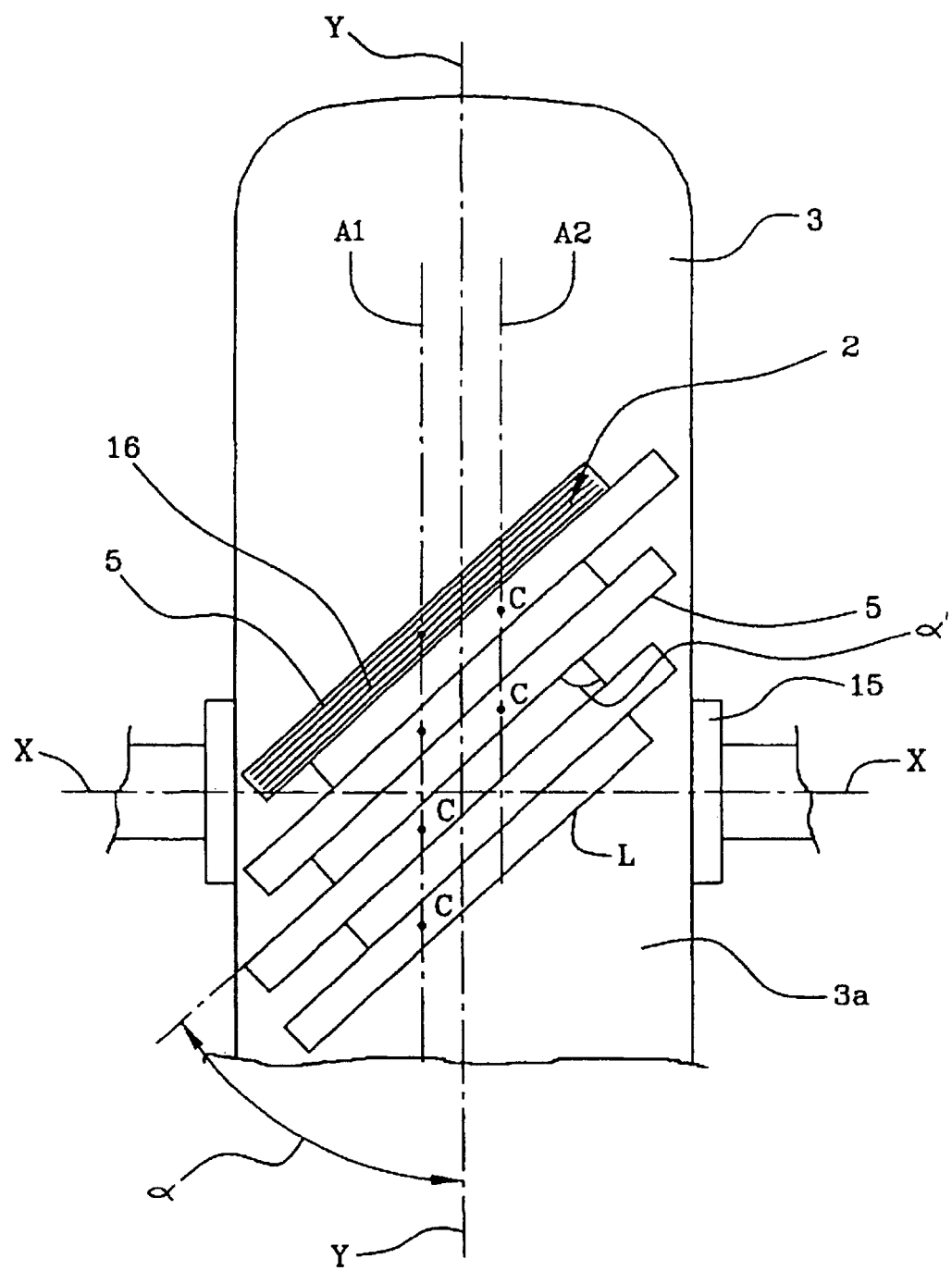
FIG. 6 shows a diagram illustrating the laying of the band-like portions, performed according to a further embodiment of the present invention.
Figure 7:
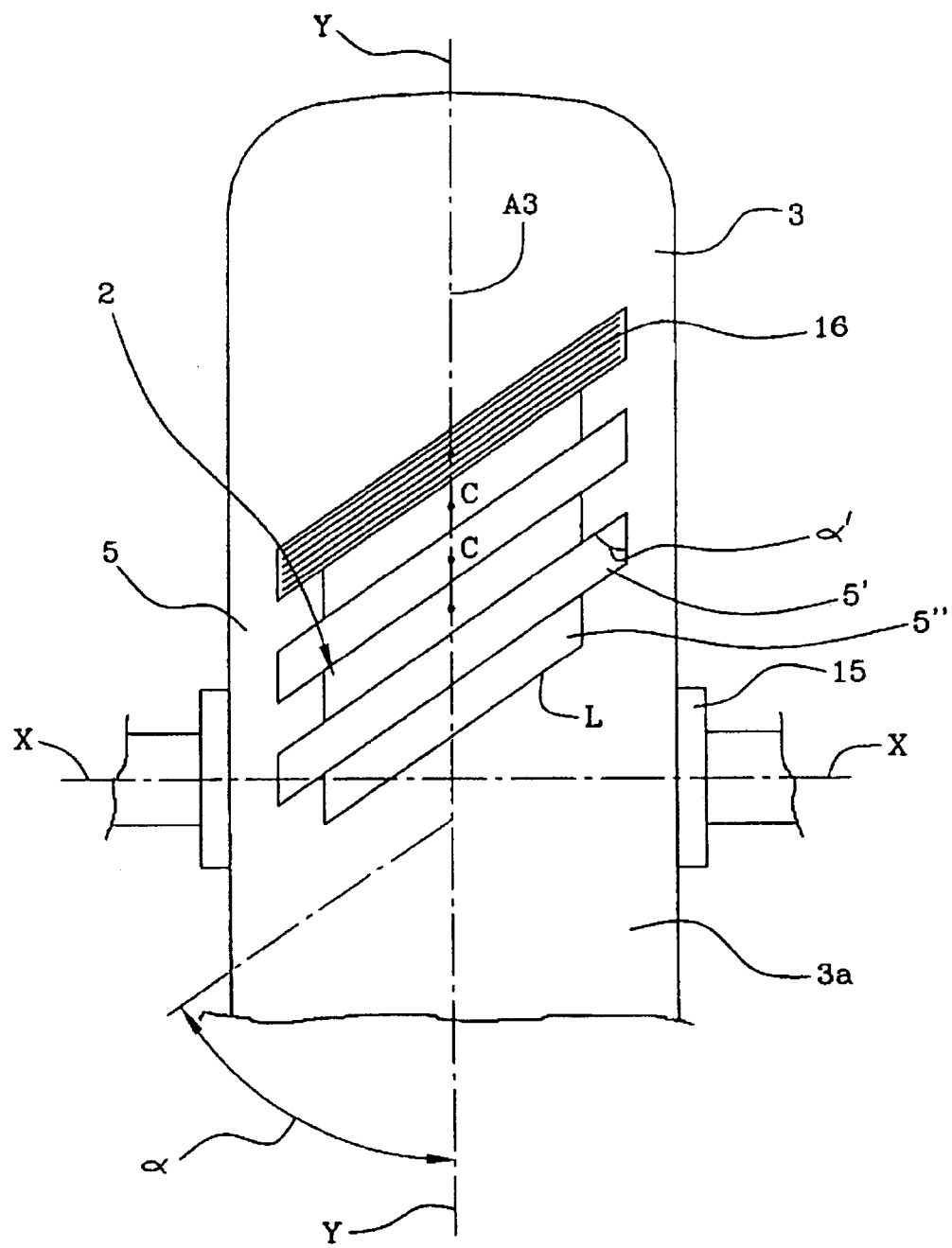
FIG. 7 shows a further diagram illustrating the laying of the band-like portions, performed according to a different embodiment.

With reference now to FIGS. 5, 6 and 7, the method according to the invention will be described in greater detail.

In accordance with the embodiments of the method of the present invention, schematically shown in FIGS. 5 and 6, the band-like portions 5, when prepared so as to have the same length, are laid in a mutually adjacent arrangement along their greater side L, with an irregular transverse position, i.e. arranged staggered transversely, preferably using repetitive procedures. In this way, the smaller sides of each band-like portion 5 are circumferentially non-aligned with the smaller sides of the circumferentially adjacent band-like portions.

More precisely, the staggering of the band-like portions may be obtained by arranging each portion 5 with its centre line relative to the larger side, preferably with its centre, alternately in one of at least two positions transversely displaced from the equatorial plane (Y-Y) of the tyre being formed.

As a consequence, the centres C of the portions laid in succession will be located alternately aligned on one of at least two, but preferably on a pair of, parallel straight lines A1, A2 lying on opposite sides of the equatorial plane, instead of being all aligned on a single straight line arranged along the equatorial plane (Y-Y). Preferably, the two straight lines of said pair are equidistant from the equatorial plane (Y-Y) of the tyre.

In FIG. 5, the portions have been obtained with a transverse cut of the thin band at an angle α', in particular an angle equal to the angle of lay α, so that the side edges of the portions in the belt strip are arranged parallel to the direction of the equatorial plane (Y-Y) of the tyre.

In the embodiment shown in FIG. 6, the portions have been obtained with a cut of the thin band perpendicularly with respect to the direction of the reinforcing elements 16, or the greater side L, so that the side edges of the portions in the belt strip are arranged in a direction which is inclined with respect to the equatorial plane (Y-Y) of the tyre.

It should be noted that in the particular case where the straight lines A1 and A2 coincide with the equatorial plane (Y-Y) of the tyre being formed, if the cutting angle α' is different from the angle of lay α, a non-linear circumferential profile of the edge of the belt is obtained in any case: in this case, however, for the purposes of obtaining a circumferential edge having a profile which extends along a broken line, the difference between said angles is of fundamental importance, which difference should preferably be greater than 3°.

According to a different embodiment of the method in question, as illustrated in FIG. 7, the band-like portions 5 are prepared so as to have different lengths with respect to each other, for example band-like portions 5' of greater length and band-like portions 5" of smaller length are possible. The latter are laid in alternate succession, i.e. one long portion and one short portion, arranged mutually adjacent along their greater side L, with transverse positioning which is preferably uniform, i.e. not transversely staggered, using repetitive procedures, so that the centres C of the portions laid in succession are aligned along a single straight line A3 coinciding with the equatorial plane (Y-Y) of the tyre being formed.

Consequently, in this case also, the smaller sides of each band-like portion 5', 5" are circumferentially non-aligned with the smaller sides of the circumferentially adjacent band-like portions.

In a similar manner to that illustrated previously in FIGS. 5, 6, in this case also, the above-mentioned portions may be obtained with a transverse cut at an angle α', in particular equal to the angle of lay α, or with a cut perpendicular to the direction of the reinforcing elements 16, so that their side edges are respectively parallel to the direction of the equatorial plane (Y-Y) of the tyre or inclined with respect to said plane.

In summary, therefore, it is possible to implement the method according to the invention using, alternately, band-like portions of identical length which, when laid, have centres which are not aligned, or band-like portions of different length which, when laid, have centres optionally either aligned or not aligned, where, in each case, the smaller sides of the portions may be directed either circumferentially with respect to the tyre or at a different angle of inclination, in particular perpendicularly with respect to their greater sides.

Preferably, the smaller sides of the band-like portions have a length of between 4 mm and 30 mm.

It should be noted that, if the above-mentioned band-like portions should have an identical length and curved smaller sides, the method in question could in any case be implemented also by arranging said portions with the centres aligned and with any angle of lay: the circumferential edge of the resulting belt strip would in any case be formed by a broken line in the sense of this term as defined above.

According to another embodiment, not shown in the drawings, the alternate arrangement in two transversely different positions may relate to groups of two or more adjacent portions 5. Another conceivable arrangement is one in which groups of adjacent portions formed by one, two or more adjacent portions are distributed in an alternate manner in two, three or more transversely offset positions.

It should be noted that, in this case, the progression of the density of the cords in the peripheral side zone does not vary continuously, but as multiples of a given value, corresponding to the density of the cords in the individual portions 5, or to a whole submultiple thereof, if the belt is formed by two or more layers. However, by suitably choosing the density of the band-like portions 5, the progression of any staggering, and the number of layers of the belt, it is possible to obtain a density profile in the peripheral side zone which varies in the desired manner.

For example, the distance of said parallel straight lines from the equatorial plane (Y-Y) of the tyre being formed ranges between 2 mm and 10 mm. Correspondingly, the width of the peripheral side zones with a non-uniform density (or the extent of the lateral staggering) is in the region of 4-20 mm.

Finally, it should be pointed out that the belt structure of a tyre is generally formed by two or more belt strips. In a preferred embodiment of the method in question only the radially innermost belt strip is formed with one of the alternative solutions illustrated above. Then at least the ends of said strip are lined with a very thin film of elastomer material, which is preferably rolled after laying. Said rolling achieves the result of eliminating the air pockets which remain trapped between the ends of said belt strip and said film of elastomer material. Otherwise, said air pockets, increasing in volume during vulcanization of the tyre, could damage the structure of the tyre itself.

The successive strips of the belt structure are formed, using the traditional technique or by means of laying of wires or thin bands, above the above-mentioned film, said strips having substantially circumferential edges devoid of broken-line sections as in the belt strips known in the art. Moreover, said additional radially outermost belt strips will preferably have a width smaller than that of the strip formed previously, said strips being generally contained within the broken-line edges of the latter.

Finally, the deposition of a layer at 0° axially extending at least over the whole surface of the abovementioned radially outermost strips is preferably performed.

A belt structure thus formed retains the advantages of the circumferential edges formed by broken-line sections, since the film of elastomer material superimposed on the first belt strip does not suppress the behaviour associated with the geometry of the latter, because of its limited thickness, while it avoids the problems caused by the presence of air pockets inside the tyre, during the vulcanization step, as specified above.

With the method in question it is therefore possible, without additional costs or structural modifications of the plant, to form a belt structure by means of, for example, the laying of band-like portions as illustrated above, thus eliminating the "hinge effect" on the side of the tyre, with a consequent greater structural strength and less wear of the tyre.

Moreover, the truncated ends of the threadlike reinforcing elements, which are devoid of the protective lining, are no longer arranged along a single circumferential side profile; the formation of preferential paths along which separations or tears between rubber and metal could spread is therefore avoided.

Finally, with the method according to the invention, it is possible to produce tyres in which the rigidity gradient along the edges of the belt strips is smaller, substantially reducing the sudden variation in the rigidity value of the tyre carcass along the edges of the belt structure, so as to obtain improved and more gradual travel characteristics.

The invention claimed is:

1. A method of producing a belt structure for a vehicle tyre, comprising:
    forming a radially innermost belt strip comprising a continuous circumferential extension about a geometrical axis of rotation of a preparation drum, the radially innermost belt strip including a plurality of reinforcing cords; and
    forming at least one radially outer belt strip comprising a continuous circumferential extension about a geometrical axis of rotation of the preparation drum,
    wherein the plurality of reinforcing cords in the radially innermost belt strip are parallel to each other within the belt strip so that the reinforcing cords do not cross each other within the belt strip,
    wherein only the radially innermost belt strip is formed so as to have circumferential broken-line edges each with a profile extending along a broken line,
    wherein the at least one radially outer belt strip is formed so as to have circumferential continuous edges each with a profile extending along a continuous unbroken line, and
    wherein the at least one radially outer belt strip has a width smaller than a width of said radially innermost belt strip, so that said at least one radially outer belt strip is contained within the broken-line edges of the radially innermost belt strip.

2. The method of claim 1, wherein the drum is a toroidal support formed in accordance with a radially internal surface of the tyre.

3. The method of claim 1, wherein the radially innermost belt strip is formed by wrapping at least one continuous longitudinal thread element onto the drum using an alternating outward and return movement in a direction inclined at a predefined angle of lay with respect to a direction of circumferential extension of the drum.

4. The method of claim 1, further comprising:
    preparing band portions for the radially innermost belt strip, each band portion having consecutive sides of different length; and
    applying the band portions to the drum;
    wherein, when applied, the band portions are mutually adjacent to each other along longer sides of the band portions,
    wherein the longer sides of the band portions comprise a predefined angle of lay with respect to a direction of circumferential extension of the drum, and
    wherein each band portion comprises at least one longitudinal thread element.

5. The method of claim 4, wherein the band portions are cut from a continuous band element.

6. The method of claim 4, wherein the band portions comprise a plurality of the longitudinal thread elements arranged parallel to each other.

7. The method of claim 5, wherein a direction of cutting of the continuous band element forms a cutting angle with respect to a direction of the longitudinal thread elements.

8. The method of claim 7, wherein the cutting angle is equal to the predefined angle of lay.

9. The method of claim 5, wherein the band portions are cut in a direction substantially perpendicular to that of the longer sides of the band portions.

10. The method of claim 4, wherein the band portions are applied so that centers of the band portions are located on a straight line coinciding with an equatorial plane of the tyre being formed.

11. The method of claim 5, wherein the band portions are cut to a same length.

12. The method of claim 4, wherein the band portions are applied so that centers of the band portions are located alternately on at east two parallel straight lines situated on opposite sides of an equatorial plane of the tyre being formed.

13. The method of claim 12, wherein two of the parallel straight lines are equidistant from the equatorial plane of the tyre being formed.

14. The method of claim 13, wherein the distance of the two parallel straight lines from the equatorial plane of the tyre being formed is greater than or equal to 2 mm and less than or equal to 10 mm.

15. A vehicle tyre, comprising:
    a carcass structure;
    a tread band extending circumferentially around the carcass structure; and
    a belt structure circumferentially interposed between the carcass structure and the tread band;

wherein the carcass structure comprises at least one carcass ply, wherein the at least one carcass ply comprises reinforcing cords, wherein the reinforcing cords are oriented substantially along radial planes comprising an axis of rotation of the tyre, wherein the belt structure comprises at least one pair of belt strips, wherein the at least one pair of belt strips comprises a radially innermost belt strip and a radially outermost belt strip;

wherein the radially innermost belt strip is formed directly on the carcass structure;

wherein the radially outermost belt strip is radially superimposed on the radially innermost belt strip, wherein the radially innermost belt strip and the radially outermost belt strip each comprises a plurality of reinforcing cords parallel to each other within each belt strip so that the reinforcing cords do not cross each other within each belt strip, wherein the reinforcing cords of the radially innermost belt strip and the reinforcing cords of the radially outermost belt strip are obliquely oriented in opposite directions with respect to an equatorial plane of the tyre, wherein only the radially innermost belt strip comprises circumferential broken-line edges each with a profile extending along a broken line, wherein the radially outermost belt strip is formed so as to have circumferentially continuous edges each with a profile extending along a continuous unbroken line, and wherein the radially outermost belt strip comprises a width smaller than a width of said innermost belt strip, so that said outermost belt strip is contained within the broken-line edges of the innermost belt strip.

16. The tyre of claim 15, wherein the plurality of band portions each have consecutive sides of different length.

17. The tyre of claim 16, wherein a circumferential profile of at least one edge of the radially innermost belt strip comprises shorter sides of the band portions parallel to the equatorial plane of the tyre.

18. The tyre of claim 16, wherein a circumferential profile of at least one edge of the radially innermost belt strip comprises shorter sides of the band portions inclined with respect to the equatorial plane of the tyre.

19. The tyre of claim 16, wherein the shorter sides of each band portion comprise a dimension greater than or equal to 4 mm and less than or equal to 30 mm.

20. The tyre of claim 15, wherein the innermost belt strip comprises at least one continuous longitudinal thread element, and wherein the at least one longitudinal thread element comprises successive convolutions arranged in a direction inclined at a predefined angle of lay with respect to a circumferential extension of the tyre.

* * * * *